Dec. 28, 1937. J. KREMER 2,103,469
APPARATUS FOR BAKING DOUGH PRODUCTS AND THE LIKE
Filed Dec. 7, 1935 3 Sheets-Sheet 2
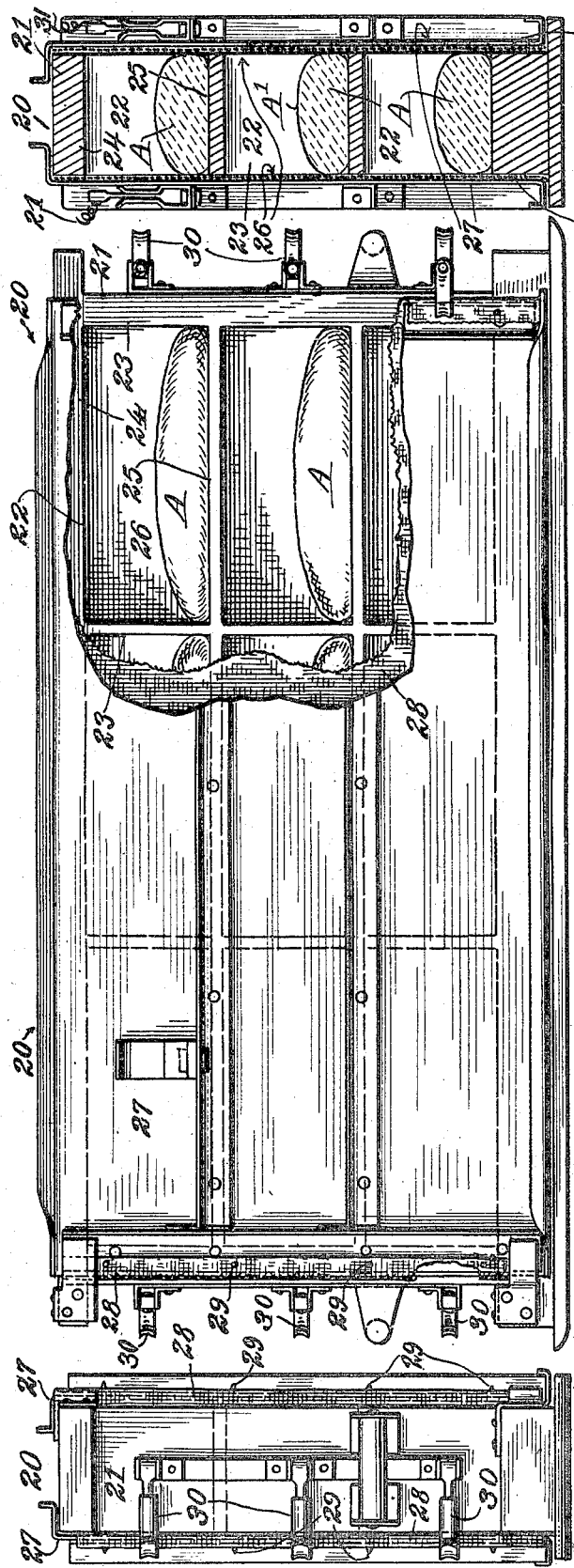
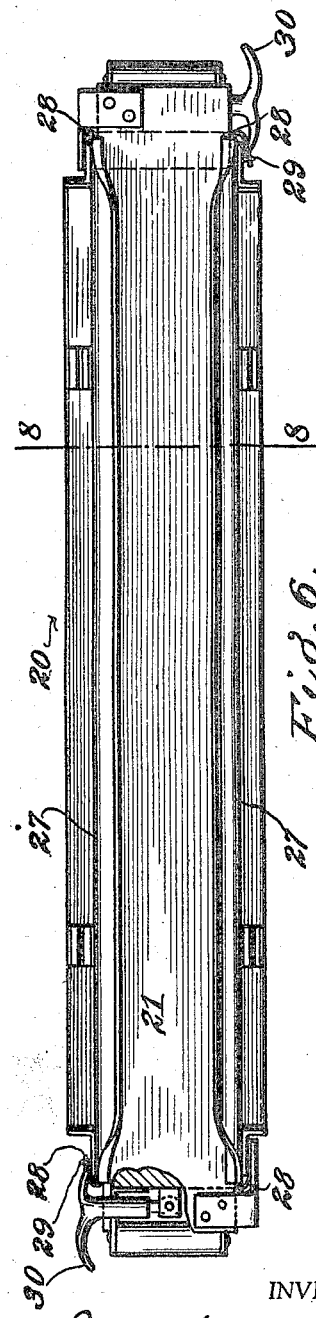
INVENTOR.
John Kremer
BY Conrad A. Dieterich
his ATTORNEY.

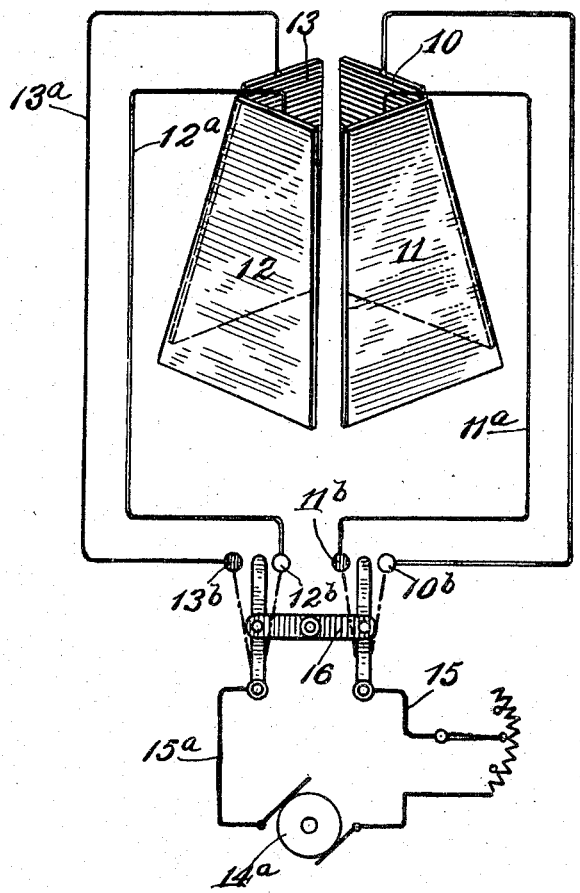
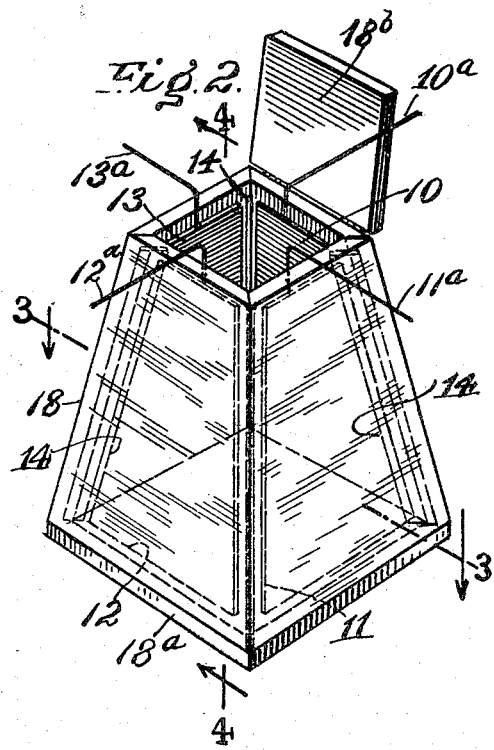
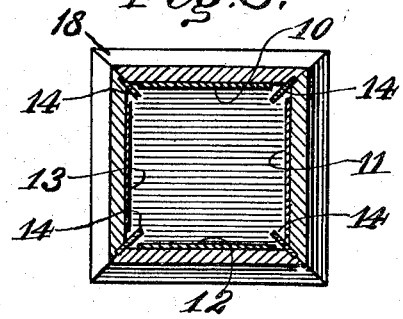

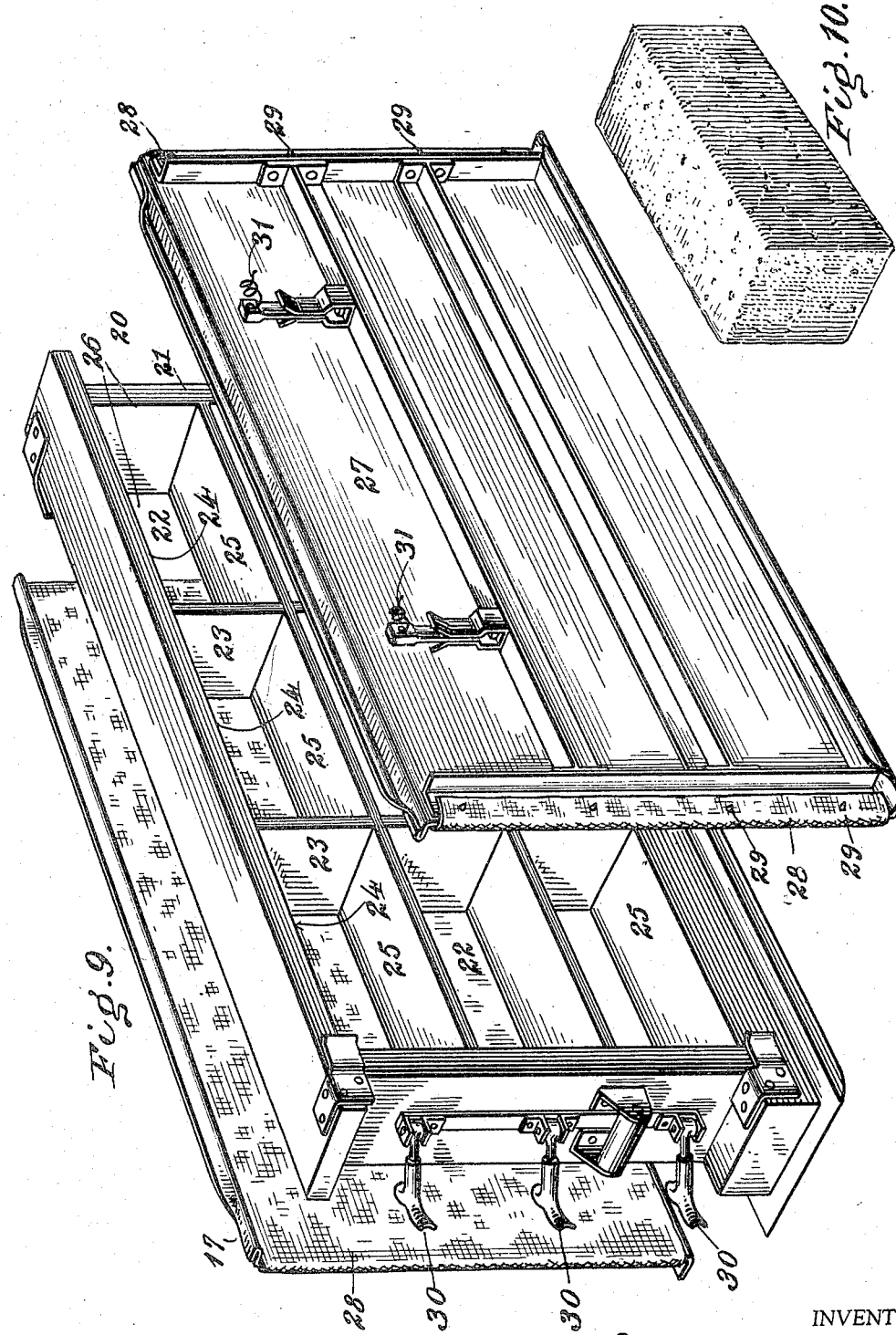

Patented Dec. 28, 1937

2,103,469

UNITED STATES PATENT OFFICE 2,103,469

APPARATUS FOR BAKING DOUGH PRODUCTS AND THE LIKE

John Kremer, Southport, Conn.

Application December 7, 1935, Serial No. 53,409

18 Claims. (Cl. 219—19)

My invention relates to improvements in the art of baking alimentary dough products of various kinds, and the same has for its object to provide means whereby a palatable product of uniform texture and pleasing in appearance, taste and touch may be produced in minimum time, and at comparatively small cost in labor and equipment.

Further, said invention has for its object to provide an apparatus whereby a dough product of substantially uniform texture may be produced without the crust or rind present on bread, cake and similar food products when the same are produced by the common or usual baking process carried out in heated ovens or the like.

Further, said invention has for its object to provide an apparatus by means of which a mass of dough may be subjected to the action of electrical energy in the form of current or the like and caused to traverse the mass and translated into heat due to the resistance of said mass to the passage of said electrical energy therethrough.

Further, said invention has for its object to provide an apparatus whereby the dough mass may be converted or baked without unduly drying out or burning the surfaces at the points of contact and thus preventing high resistance occurring at said points of contact which would otherwise tend to impede the flow of current and the uniform distribution thereof throughout the mass, and cause unsightly markings on the surfaces of the product.

Further, said invention has for its object to provide an apparatus in which the surfaces of the dough mass which contact with the electrodes may be heated to insure good, uniform electrical contact at the electrodes in order to obviate undue high resistances at the contacts due to the usual dry or semi-dry floured skin which forms on the surfaces of the dough mass.

Further, said invention has for its object to provide an apparatus of the character specified in which a mass of dough may be subjected to the action of electrical energy in order to bake the same by the heat uniformly and simultaneously produced within the dough mass by the resistance of the mass to the passage of the electrical energy or current therethrough.

Further, said invention has for its object to provide an apparatus of the character specified in which one or more of individual dough units may be simultaneously and uniformly subjected to the action of electrical energy and baked.

Further, said invention has for its object to provide an apparatus of the character specified in which a receptacle or frame is employed having a plurality of separate compartments therein, each of which is adapted to receive a separate mass or element, and in which the said several dough masses or elements may be subjected to the action of electrical energy to simultaneously and uniformly bake the same.

Further, said invention has for its object to provide an apparatus of the character specified which is simple and inexpensive in construction, and which requires less care, labor and time in the use and operation thereof than the apparatus at present required in the ordinary or usual baking process now commonly practiced.

Other objects will in part be obvious, and in part be pointed out hereinafter.

To the attainment of the aforesaid objects and ends, my invention consists in the novel features of construction, and in the combination, connection and arrangement of parts hereinafter more fully described, and then pointed out in the claims.

In the accompanying drawings—

Figure 1 is a diagrammatic view showing certain of the essential elements of one form of apparatus for carrying my invention into effect;

Fig. 2 is a perspective view showing one form of container or frame used in carrying out my said invention;

Fig. 3 is a cross-section on the line 3—3 of Fig. 2;

Fig. 4 is a section on the line 4—4 of Fig. 2;

Fig. 5 is an elevation illustrating a modified form of apparatus, parts being broken away to expose the interior of the apparatus to view;

Fig. 6 is a plan of the construction shown at Fig. 5;

Fig. 7 is an end view thereof;

Fig. 8 is a cross-section thereof on the line 8—8 of Fig. 6, showing the proofed dough in position therein;

Fig. 9 is a perspective view showing the receptacle or frame and the electrodes in separated relation thereto, and Fig. 10 is a perspective view showing a loaf of bread produced by the apparatus.

Referring to Figs. 1 to 4, inclusive, 10, 11, 12, and 13 represent four vertically arranged plates of uniform size made of aluminum, carbon or other suitable conducting material with the edges thereof separated and preferably insulated from each other by relatively thin members or baffles 14 formed of glass, mica, paper, or other suitable insulating material and disposed angularly between the adjacent edges of said electrodes. The said members or baffles 14 are maintained in position by grooves provided in the inner walls or sides of the container or frame 15 and serve further to direct the current along certain lines of flow, and to reduce the current density at the electrodes. From the plates 10, 11, 12, and 13 extend conductors 10$^a$, 11$^a$, 12$^a$, and 13$^a$, respectively, whose outer ends are connected to contacts 10$^b$, 11$^b$, 12$^b$, and 13$^b$. An alternating current or other generator 14ᵃ has one terminal 15 connected to one end of a movable switch or circuit closing device 16, adapted to be actuated by any suitable means, and its other terminal 15ᵃ also connected to said switch or circuit closing device 16.

In order to make the bread the mass of dough is disposed within a frame or container 18, composed of refractory or insulating material or of any other suitable material lined with insulating material. The said frame or container may be open at its top and bottom, and may be provided with a hinged base and cover portions 18ᵃ, 18ᵇ, respectively. The frame or container is preferably formed with upwardly tapering sides in order to facilitate the ready withdrawal of the finished product from the bottom thereof.

The plates 10, 11, 12, and 13 are disposed within the frame or container in separated relation against the inner walls or sides thereof. In order to improve the contact between the dough and the inner sides of said plates 10, 11, 12, and 13, the latter, for example, may be coated or treated with a mixture of fatty matter and salt water, or with any other suitable conducting medium such as a paste consisting of vinegar or other conducting substance mixed with sugar, starch or other appropriate paste forming substance. By covering the inner surfaces of the plates 10, 11, 12, and 13 with a fatty solution containing salt two objects are accomplished, viz: (a) the dough or baked product is protected against staining or contamination by the electrodes or by products resulting from electrolysis, and (b) the finished bread or other product is prevented from adhering to the plates, and thus rendered more readily removable from the container.

A current of high voltage for quick baking, (lower for slow baking,) is caused to pass, for example, from the plate 12 by way of contacts 10ᵇ and 12ᵇ, and conductors 10ᵃ and 12ᵃ, and thence, after a brief interval, the circuit closing device is actuated, and the current caused to flow from the generator 14 by way of the conductors 15 and 15ᵃ to the switch or circuit closing device 16 to the contacts 11ᵇ and 13ᵇ, conductors 11ᵃ and 13ᵃ, and caused to pass through the dough from the plate 11 to the plate 13. Variation in line of flow or shift of axis of the current is caused by shifting the switch 16, and the variation in line of flow of current is continued during the entire period of time that the bread is subjected thereto. To insure uniform baking each voltage should be proportional to distance between the electrodes.

The use of carbon for the electrodes is preferable if salt grease is used because carbon is not affected by electrolysis directly while aluminum is. If the electrodes are made of a metal liable to form toxic compounds, it is preferable to separate the same from the dough by paper or other similar porous material moistened in salt water or in a mixture of salt water and grease to prevent contamination and sticking, and to moisten the outer surface or skin of the dough in order to improve the conductivity at the juncture of the electrodes with the dough, or the aluminum or other metallic electrode may be coated with a carbonized or oxide surface, and the latter with the salt grease forming a good electrode combination.

In the modification to Figs. 5 to 9, inclusive, of the drawings, the apparatus 20 is preferably adapted for effecting the baking or conversion of loaves of bread on a commercial scale, and the same comprises a frame or box 21 of suitable electric non-conducting material, for example, whitewood, and which will not impart any odor or flavor to the dough product during the baking operation. The said frame contains a plurality of cells or compartments 22 for receiving the lumps or slabs of dough A for baking.

Each of the several compartments 22 comprises the end wall portions 23 and the top and bottom wall portions 24 and 25; the remaining sides thereof being fully open, as indicated at 26. Each container 21 may be constructed to hold any desired number of loaves, a container having nine cells being shown. The dimensions of each compartment preferably correspond to the dimensions of the loaf to be produced, the size of the load depending on the desired weight thereof. As one example, a box having nine compartments of a size for baking loaves 4" x 4" x 22" has been used in practice.

The dough is prepared in substantially the usual manner to form a homogeneous mass of uniform structure, the moisture content being uniformly distributed to render the mass of uniform electrical conductivity throughout. The dough is then molded into slabs or pads of uniform size and weight, as desired, the slabs being each molded as nearly as possible into a flat pad of uniform thickness and of a cross-section horizontally equal in area to that of the bottom 25 of the compartment in which the slab is to be baked to conform the same thereto in shape. The molded slabs A are then placed in the several cells 22, and the plate electrodes 27 applied. The electrodes 27 are common to, and coextensive in area with the open sides 26 of the several cells of the box 21, and form a complete closure for the several compartments containing said slabs A. The electrodes are preferably composed of pure iron. The box 21 and electrodes 27 also serve partly as a mold to limit the extent of expansion of the slabs during the proofing thereof and determining the shape of the final product or loaf. The interior walls of the several cells 22 may be, if so desired, provided with a thin coating of lard or other grease.

Before applying the electrodes 27, the inner surfaces thereof are preferably coated with a suitable light vegetable oil in a thin film to avoid rusting, and are then covered with pieces of porous material, such as the cloth 28 thoroughly wet with a solution of an electrolyte or with hard water serving as such electrolyte, lime water preferably being employed as a non-corrosive electrolyte. The cloths 18 are stretched tightly in place upon the electrodes 27, and in intimate contact with the metal, and are held in place by hooking the same on the barbs 29 which project from the outer side of the electrodes near the ends thereof.

The electrodes 27 are clamped against the opposite open faces 16 of the container 21 by means of the spring clamps 30 which, during the proofing and baking of the dough, allow the electrodes 27 to yield at opposite ends in response to the expansion thereof, the dough being firmly pressed against the electrodes during the baking process. Current is supplied to the electrodes 27 through detachable conductors 22 from a suitable source of energy, preferably of alternating current.

After the electrodes 27 are applied, the contents of the box 21 are allowed to rise or proof, preferably in a warm humid atmosphere to cause the dough masses or slabs A to expand and press firmly against the electrodes and make good contact therewith, the slabs by this time partially filling the cells 22. When the proofing has proceeded to the required extent, the full current is turned on to complete the proofing operation, and to convert or bake the dough. During the initial flow of current the several dough masses rapidly expand and completely fill their cells 22, and become conformed to the contour thereof, making the slabs substantially uniform in cross-section in planes parallel with the electrodes and providing uniform contact with the electrodes. When the predetermined quantity of energy required for effecting the baking has been applied, the supply current may be discontinued either manually or automatically, as desired.

After the baking operation is completed, the spring clamps 30 are disengaged and the conductors 31 disconnected, the cloths 28 meanwhile being disengaged from the barbs 29, and the electrodes 27 then removed from the frames or boxes 21, leaving the cloths 28 in contact with the loaves. The cloths 28 are then stripped off, and the box 21 tipped onto a support comprising a frame having a wire mesh fabric secured thereon. The box is then lifted off leaving the loaves on the wire mesh fabric of the frame where they are allowed to cool.

In practicing my invention I control the moisture distribution so as to render uniform the current flow through the mass. For example, the provision of the damp cloths or dampened material 28, improves the contact between the dough and the electrodes to prevent charring or undue drying out of the portions of the dough contiguous to the electrodes which would otherwise be liable to interfere with the uniform flow of current through the mass. In order to obtain uniform current distribution throughout the dough mass, and consequent uniform heating and drying thereof, it is necessary to provide uniform electrical contact with the dough. In molding the dough before baking, the dough is necessarily floured and this coating of dry flour is not uniform, and the surface of the dough as indicated at A', Fig. 4, tends to form a dry or semi-dry film or skin of relatively high resistance about the same. By interposing the damp cloths 28 between the electrodes 27 and the dough mass the floured surfaces or films A' are sufficiently moistened to obviate a plane of local dryness or high resistance which form, in effect, critical sections at the contacts, and to form, because of the action of the electrolyte present in the moisture, good uniform electrical contact between the electrodes and the surfaces of the dough for the uniform distribution of current throughout the mass, the uniformity of current distribution being enhanced by having the dough mass of fairly uniform texture and cross-sectional area in planes parallel with the electrode faces. The cloths 28 also protect the loaf or product against staining or contamination from the electrodes, and to prevent the bread or other product from adhering to the electrodes so that the finished loaves can be readily removed undamaged.

In the operation of my apparatus the current is made to traverse the dough simultaneously and uniformly throughout the mass thereof, and the electrical energy, due to the resistance of the mass, generates heat within the dough simultaneously and uniformly throughout the mass thereof and serves to convert the dough into the finished product. In practicing my invention I coordinate the voltage and the time required for baking or the time of current flow so as to prevent the formation of critical sections, either at the electrodes or elsewhere through the mass of dough so that the process of drying or baking or conversion of the mass proceeds uniformly throughout the mass without causing the undue drying out of certain portions thereof more than others which would result in the development of sections having resistance differing from each other and tending to cause unequal distribution of current and the generation of more heat in one portion of the mass than in another.

I have discovered that critical sections tend to form, particularly at certain of the electrode faces, when voltages beyond a given value are applied. More voltage is required as the speed of baking is increased, i. e. as the baking time required is reduced. The voltage required, for a given baking time, is also proportional to the distance between the electrodes. The current required will also vary with the moisture content and with the quantity and character of any salt acting as an electrolyte incorporated in the dough. In baking the larger loaves it is preferable to pass the current through the slabs between the electrodes, over the shortest path. When the loaves are smaller, and the maximum dimension thereof is short, it is immaterial in which direction the current is passed through the loaf. In practice I find that the amount of electrical energy required to effect the baking of a particular mass of dough, or the completion of the conversion thereof is predetermined and substantially constant. For example, in baking bread the energy required is approximately forty (40) to forty-five (45) watt hours per pound of dough, the baking time and the voltage applied being varied according to conditions or requirements. With my invention I have found that bread can be perfecaly baked at higher voltages in as little time as about three minutes. However, at such baking speeds there is a tendency to form a critical section near one of the electrodes. At lesser voltages requiring four or five minutes baking the product is more uniform and the tendency to form a critical section near the electrode much reduced. With baking at preferred speeds of about eight to ten minutes very satisfactory results are obtained. In my invention the voltage applied is minimized to the extent preventing the formation of critical sections without unduly increasing the time of baking, and the flow of current continued until the quantity of energy required to effect the conversion has been consumed.

During the baking operation there is rapid evolution of water vapor or steam together with alcohol vapor escaping through the openings or crevices between the electrodes 27 and the box 21, the odor of the alcohol vapors being very noticeable. The interposition of the relatively loose mesh fabric or porous material 18 between the product being baked and the electrodes 27 tends to facilitate the escape of the vapors and gases. During the baking operation the mass of dough is retained and confined by the wall of the box 21 and the electrodes 27 and in uniform contact with the electrodes, and the final product conforms to the contour of the enclosure and corresponding size and shape thereto.

During the proofing and baking steps the electrodes 27 may yield to compensate for increase in size of the loaf and still remain in full engagement with the opposite sides of the baking mass to insure good contact and proper molding of the loaf. The completion of the baking operation may be determined by cessation of the escape of alcoholic vapors, which can be readily noted by the sense of sight and smell, or the completion of the baking operation may be ascertained when the required amount of energy has been consumed resulting in the automatic opening of the circuit.

The distribution of moisture in the dough and the escape of moisture from the dough may be controlled by the provision of properly located vents in the enclosures in which the dough is being baked, by preventing precipitation of moisture at the electrodes because of the chilling effect thereof, or by baking the dough in vacuo. The voltage applied at the electrodes should be such as to prevent the formation of critical sections or charring adjacent to the electrodes or at points extending substantially from one electrode to the other while effecting the conversion or baking of the dough in a reasonably short time. The tendency to char may be reduced by keeping the electrodes or the material adjacent thereto moist or cool, due consideration being given to the prevention of excessive moisture precipitation near the electrodes.

Heat substantially uniformly applied by means of electric current, as contrasted with the crusting heat of a furnace, permits simultaneous expansion and cooking of all portions of the mass of dough so that every part can be subjected uniformly to heating, which could only be applied to limited portions of the dough in an oven baking process, and the time required for effecting the baking is much less than in oven baking. This results in the production of high quality products irrespective of the size of the mass in less time than that required for oven baking. Appreciable saving in energy is possible because the dough is heated by the passage of current through it without appreciable loss of heat instead of being heated by radiation or by contact with hot gases, the heat from which is largely dissipated or lost, or reaches the interior of the dough with difficulty because the material is a very poor thermal conductor.

The present apparatus may be employed for making bread, or the like, of various kinds employing different types of flour whether leavened or unleavened, for reheating the same, or for making products in which the dough is incorporated with other food substances.

My invention is particularly adapted for baking dough products containing raisins, fruits, nuts, etc. often used in breads and cakes and liable to be deleteriously affected by high temperatures, because in my method the mass is baked at temperatures not exceeding 212° F. maintained substantially uniform throughout the mass. Hence the baking can be effected without change in the uniformity of character or flavor of such ingredients, and particularly of those lying near the outer surfaces. In ordinary baking by the external application of heat, the intense heat burns or scorches the raisins, fruits or like ingredients making the same bitter and unpalatable.

The apparatus shown and described because of its simplicity, permits of the use of containers or baking boxes which are simple and cheap in construction and more readily cleaned, and the simple electrical equipment employed requires very little care for maintenance and can be readily manipulated in performing the method, thereby substantially reducing the labor costs.

At Fig. 10 I have shown, as one example of a product resulting from my said method and apparatus, a loaf of bread conforming in shape to that of the baking compartment. The loaf as thus formed has an outer surface in the form of a thin film or skin having a soft, non-brittle texture of good appearance, and lacking the hardness, brittleness, color and other characteristics or qualities of a crust or rind as is commonly found in bread produced by ordinary baking methods in which the previously prepared dough is placed in suitable pans or containers, and then introduced into a heated chamber or oven and subjected to the action of heat, externally applied to bake the dough mass to the desired extent.

The bread, cake or other dough product, as the case may be, may consist of the usual ingredients such as flour, milk, fat, water, salts, and a suitable fermenting or leavening medium such for example as yeast or baking powder, in the case of bread, and may also include eggs, flavoring or fruits, spices, etc., in the case of cake. These ingredients are preliminarily prepared and treated in the same manner as in preparation for oven baking as heretofore practiced.

The bread or cake made according to my invention differs from the oven baked product in that the same is produced without the customary hard browned crust or rind, and forms a product of good external appearance devoid of unsightly markings or discolorations on the surfaces thereof, and is particularly adapted for use in making sandwiches and toast and without requiring trimming and attendant waste as does the usual bread when baked in the common forms of heated ovens.

Further, it is to be noted that bread dough and the like may be preliminarily warmed by the electrical generation of heat therein in order to proof the same, and cause it to rise preparatory to subjecting the same to the further or baking operation.

This application is, in part, a division, and, in part, a continuation of my copending application Serial No. 354,467, filed April 12, 1929, which resulted in Letters Patent No. 2,023,478, dated December 10, 1935.

Having thus described my said invention what I claim and desire to secure by Letters Patent is:

1. An apparatus of the character described comprising a receptacle adapted to receive a dough mass, a plurality of sets of oppositely disposed electric contact elements interposed between said dough mass and the walls of said receptacle, a source of current supply, and means for successively supplying current severally to said sets of contact elements.

2. An apparatus of the character described comprising a receptacle adapted to receive a dough mass, a plurality of sets of oppositely disposed electric contact elements interposed between said dough mass and the walls of said receptacle, and a coating of conducting medium disposed upon the inner surfaces of said electrodes, a source of current supply, and means for successively supplying current severally to said sets of contact elements.

3. An apparatus of the character described comprising a receptacle adapted to receive a dough mass, a plurality of sets of oppositely disposed electric contact elements interposed between said dough mass and the walls of said receptacle, inwardly extending insulating baffles disposed between the adjacent edges of said electrodes, a source of current supply, and means for successively supplying current severally to said sets of contact elements.

4. An apparatus of the character described comprising a receptacle adapted to receive a dough mass, a plurality of sets of oppositely disposed electric contact elements interposed between said dough mass and the walls of said receptacle, relatively thin insulating baffles disposed between the adjacent edges of said electrodes substantially coextensive in length therewith, and extending towards the center of said receptacle, a source of current supply, and means for successively supplying current severally to said sets of contact elements.

5. An apparatus of the character described comprising a receptacle for receiving a dough mass, and open at its opposite sides, electric contact elements coextensive with the open sides of said receptacle and constituting closures for said open sides, said contact elements being adapted to engage with the dough mass within said receptacle, and means for holding the contacts in operative engagement with said receptacle.

6. An apparatus of the character described comprising a receptacle composed of non-conducting material for receiving dough and open at its opposite sides, electric contact elements coextensive with the open sides of said receptacle and constituting closures for said open sides, said contacts being adapted to engage with the dough in said receptacle, and means for holding the contacts in operative engagement with said receptacle.

7. An apparatus of the character described comprising a receptacle having a plurality of compartments therein to receive separate dough masses, electric contact elements engaging opposite sides of said receptacle and adapted to engage with the separate dough masses therein, and means for holding said contact elements in operative engagement with said receptacle.

8. An apparatus of the character described comprising a receptacle having a plurality of compartments therein to receive separate dough masses, electric contact elements engaging opposite sides of said receptacle and adapted to engage with the separate dough masses therein, and means for holding said contact yieldingly in operative engagement with said receptacle.

9. An apparatus of the character described comprising a receptacle to receive a dough mass, electric contact elements engageable with opposite sides of said receptacle and adapted to engage with the dough mass therein, and elastic means for holding said contact elements at their diagonally opposite ends yieldingly in operative engagement with said receptacle.

10. An apparatus of the character described comprising a receptacle to receive a dough mass, electric contact elements at opposite sides of said receptacle, fabric covering secured upon the inner sides of said contacts and adapted to engage with the dough mass therein, and elastic means for holding said contact elements in operative engagement with said receptacle.

11. An apparatus of the character described comprising a receptacle having a plurality of compartments therein open at their opposite sides to receive separate dough masses, electric contact elements engaging opposite sides of said receptacle and forming closures for said compartments; said contact elements being adapted to engage with the separate dough masses therein, and means for holding said contact elements in operative engagement with said receptacle.

12. An apparatus of the character described comprising a receptacle having a plurality of compartments therein to receive separate dough masses; said compartments being open at their opposite sides, electric contact elements registering with and engageable with opposite sides of said receptacle and adapted to engage with the separate dough masses therein, and clamping devices for holding said contact elements in operative engagement with said receptacle.

13. An apparatus of the character described comprising a receptacle having a plurality of compartments therein to receive separate dough masses; said compartments being open at their opposite sides, electric contact elements coextensive in area with the open sides of said receptacle and constituting closures therefor, said contacts adapted to engage with the separate dough masses in said compartments, and means engaging with the ends of said contacts for yieldingly holding the same in operative engagement with said receptacle.

14. An apparatus of the character described comprising a receptacle having a plurality of compartments therein to receive separate dough masses; said compartments being open at their opposite sides, electric contact elements coextensive in area with the sides of said receptacle and constituting closures therefor; said contacts being adapted to engage with the separate dough masses in said compartments, and spring clamping devices on the ends of said receptacle engageable with the ends of said contacts for yieldingly holding the same in operative engagement with said receptacle.

15. An apparatus of the character described comprising a receptacle composed of wood having a plurality of compartments therein to receive separate dough masses; said compartments being open at their opposite sides, electric contact elements coextensive with the sides of said receptacle and constituting closures therefor, said contacts being adapted to engage with the separate dough masses therein, and means on the receptacle engageable with said contacts for holding the same in operative engagement with said receptacle.

16. An apparatus of the character described comprising a receptacle of non-conducting material for receiving dough and open at its opposite sides, electric contact elements coextensive with the sides of said receptacle and constituting closures therefor, said contacts adapted to engage with the dough within the receptacle, and means on the receptacle including spring connections for engaging the contacts to retain the same in yielding engagement with said receptacle.

17. An apparatus of the character described comprising a receptacle open at opposite sides and having walls including oppositely-disposed electric contact elements forming a dough-receiving mold; certain of the opposite walls of said receptacle constituting movable closures for said open sides to facilitate the removal of the finished dough product from the receptacle.

18. An apparatus of the character described comprising a receptacle open at opposite sides and having walls including at least two oppositely-disposed electric contact elements, said walls forming a dough-receiving mold; certain of the opposite walls of said receptacle being movably secured thereto and constituting closures for said open sides to facilitate the removal of the finished dough product from the receptacle.

JOHN KREMER.